United States Patent [19]

Perez et al.

[11] Patent Number: 5,708,738
[45] Date of Patent: Jan. 13, 1998

[54] APPARATUS AND PROCESS FOR MAKING FIBER OPTIC BRAGG GRATINGS

[75] Inventors: Ignacio M. Perez, Frederick, Md.; Som D. Tyagi, Wilmington, Del.

[73] Assignee: The United States of America as represented by the Secretary of the Navy, Washington, D.C.

[21] Appl. No.: 611,045

[22] Filed: Mar. 5, 1996

[51] Int. Cl.$^6$ ............................................. G02B 6/34
[52] U.S. Cl. ....................... 385/37; 385/10; 372/106; 359/566
[58] Field of Search .................... 385/37, 10, 123, 385/12, 129; 372/6, 102; 359/566

[56] References Cited

U.S. PATENT DOCUMENTS

| | | | |
|---|---|---|---|
| 5,066,133 | 11/1991 | Brienza | 385/37 X |
| 5,327,515 | 7/1994 | Anderson et al. | 385/123 |
| 5,384,884 | 1/1995 | Kashyap et al. | 385/37 X |

*Primary Examiner*—Phan T. H. Palmer
*Attorney, Agent, or Firm*—Susan E. Verona; Ron Billi

[57] ABSTRACT

At least a part of a first coherent beam of monochromatic light is incident obliquely on the reflecting surface of a mirror to produce a reflected beam in a direction different from that of the first beam. An interference pattern is produced within a volume defined by the intersection of the reflected beam with the first beam. A part of an optical fiber is positioned in the volume containing the interference pattern, and a grating is photo-induced in the optical fiber by exposure of the optical fiber to the interference pattern. A desired Bragg period in the grating can be selected by tilting the mirror to change the interference pattern.

14 Claims, 4 Drawing Sheets

APPARATUS AND PROCESS FOR MAKING FIBER OPTIC BRAGG GRATINGS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to Bragg gratings, and more particularly to improvements in the process of making Bragg gratings in optical fibers by photo-induction, and to an improved apparatus for carrying out the process.

A Fiber Optic Bragg Grating (FOBG) is a structure in the core of an optical fiber in which the index of refraction n is spatially modulated with a periodicity of $\Lambda_B$ (the Bragg period) and an amplitude of $\Delta n$.

If a broad band source of light is coupled to an optical fiber, a grating in the core of an optical fiber will reflect light in a narrow band of wavelengths depending on the Bragg period of the grating, while passing the other wavelengths. In the case of a grating having lines perpendicular to the axis of the core of the fiber, the reflections are returned along the fiber toward the light source, and can be diverted by a coupling device. Another kind of FOBG is the Tapped Bragg Grating (TBG), in which the grating lines are oblique. The TBG scatters light in a fan-shaped lobe in a direction transverse to the axis of the core of the fiber.

The FOBG has many applications, including uses in optical filters, in fiber lasers with Bragg grating mirrors, in intermodal coupling devices in few-mode fibers, in distributed strain sensors, in optical communications, and in the coupling of light into and out of planar integrated optical structures. An example of a particularly useful application of an FOBG is the distributed strain sensor, in which an optical fiber having a series of FOBGs with different Bragg periods, is embedded in, or adhesively attached to, a structure undergoing stress. Each grating serves as an independent strain sensor. Minute displacements in portions of the structure cause corresponding changes in the Bragg period in the gratings coupled to those portion of the structure. These changes in the Bragg period can be detected as changes in the spectrum of the light reflected by the gratings. A TBG can be used, for example, to detect corrosion by scattering a light beam, toward a corrosion-responsive chemical coating on the outside of an optical fiber and returning a reflection from the coating. It can also be used to demodulate optical signals reflected by FOBG sensors, and as a coupling device to couple energy into a fiber.

The earliest photo-induced gratings in an optical fiber were produced in a Germanium-doped fiber by an interference pattern generated by setting up an internal standing wave, i.e. a standing wave in the light being transmitted by the fiber. The varying energy density in the interference pattern induced permanent changes in the index of refraction of the core of the fiber. This technique did not lend itself to easy adjustment of the spacing of the grating lines or of the length of the grating.

Later, an approach known as "side writing" was introduced. An external interference pattern was produced by the superposition of two coherent laser beams, and an optical fiber was introduced into the interference region. This approach had the advantage that the interference pattern could be changed by varying the angle between the two laser beams. By changing the interference pattern, different line spacings could be achieved.

More recently, a point-by-point writing technique was developed, in which a fiber was moved at a constant velocity past a laser producing pulses at a constant rate. This technique produced a grating having a Bragg period $\Lambda_B$ $$\Lambda_B = \frac{v}{N}$$

where v is the velocity of the fiber and N is the laser pulse frequency.

Point-by point writing offered greater flexibility in the selection of line spacings and in achieving changes in the refractive index in the grating region in the fiber. However, to produce high quality gratings using the point-to-point writing method, precise control of the position of the fiber, and of the laser intensity was necessary. Furthermore, it was difficult to monitor the development of the grating.

SUMMARY OF THE INVENTION

The general object of this invention is to provide a simple apparatus and method for producing a fiber optic Bragg grating, which allows a desired Bragg period to be selected easily.

Other objects of the invention include the simplification of the apparatus and of the procedure for producing an FOBG, avoidance of high sensitivity to vibration, and avoidance of the need for precise control of fiber position and laser intensity. It is also an object of the invention to provide a simple apparatus that can be used to produce both reflecting gratings and tapped gratings.

These objects are addressed in accordance with the invention by forming a Bragg grating in the core of an optical fiber by the following procedure. A first coherent beam of monochromatic light is directed in a first direction so that at least part of the beam is an incident beam, incident obliquely on a reflecting surface to produce a reflected beam in a direction different from that of the incident beam. This produces an interference pattern within a region defined by the intersection of the reflected beam and the first beam. An optical fiber is positioned in the interference region, and a grating is photo-induced in the optical fiber by exposure of the optical fiber to the interference pattern.

Preferably, the reflecting surface is so smooth that variations in its smoothness are within one-tenth of the wavelength of the coherent beam.

To allow the optical fiber to be positioned in the interference pattern, the reflecting surface may have an opening for receiving the fiber, or alternatively the fiber can extend past a side edge of the reflecting surface. In each case, the edge of the opening, or the side edge of the reflecting surface, has a sharpness such that its radius of curvature is less than one-tenth of the wavelength of the coherent beam of monochromatic light.

To determine the Bragg angle of the grating to be produced, the angle of incidence of the beam onto the reflecting surface is adjusted, preferably by tilting the reflecting surface, before photo-inducing the grating. Thus, the same apparatus can be used to make different gratings, simply by adjusting the angle of the mirror between exposures.

The fiber is attached to the reflecting surface, and the interference pattern which produces the grating is in fixed relation to the reflecting surface. Consequently the production of the grating is comparatively insensitive to vibration.

Other objects, advantages and novel features of the invention will become apparent from the following detailed description of the invention, when considered in conjunction with the accompanying drawings.

DESCRIPTION OF THE PREFERRED EMBODIMENTS

For a better understanding of the improvements achieved by this invention, the prior art, as exemplified by FIGS. 1-4 should be considered briefly.

Figure 1:
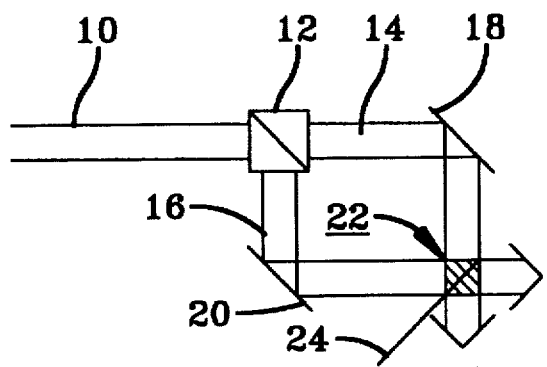
FIG. 1 is a schematic diagram illustrating the formation of a fiber optic grating by generating an interference pattern externally in accordance with the prior art.
Figure 2:
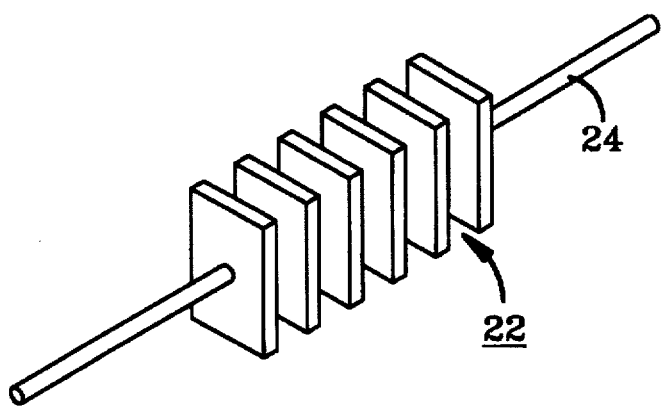
FIG. 2 is a schematic diagram showing the interference pattern of FIG. 1, in an exaggerated perspective view.

FIG. 1 illustrates the formation of an FOBG by means of a Mach-Zender interferometer. A laser beam 10 is directed through a beam splitter 12 to divide it into two separate coherent beams 14 and 16, perpendicular to each other. Beam 14 is reflected by a mirror 18 and beam 16 is reflected by mirror 20 so the two beams intersect each other to produce an interference pattern in region 22. An optical fiber 24 is exposed by extending it into the interference region, where a grating is formed in the core of the fiber. The interference pattern can be changed by tilting mirrors 18 and 20. The spacing of lines of the grating can be selected by changing the interference pattern in this manner.

Figure 3:
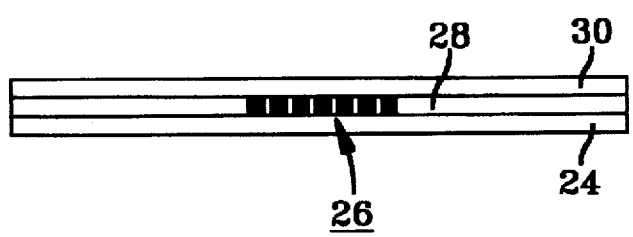
FIG. 3 is a schematic view of an optical fiber showing a conventional Bragg grating in the core of the fiber.
Figure 4:
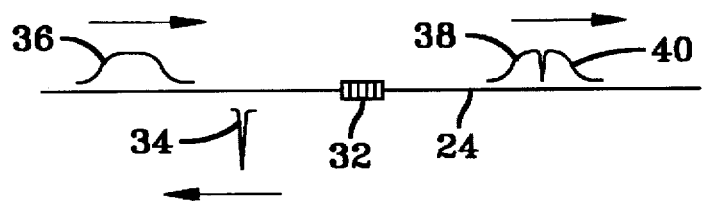
FIG. 4 is a schematic diagram illustrating the operation of a conventional fiber optic Bragg grating.

In FIG. 3, the Bragg grating 26 is seen in the core 28 of the optical fiber, the core being surrounded by cladding 30. The grating consists of a region having a periodic spatial modulation in the index of refraction. While the dark and light areas in FIG. 3 are sharply defined, in practice, the variation, Δn, in the index of refraction will normally be very small, and the variation will be generally smooth and lacking in sharp discontinuities. Despite this, the grating is capable of selecting very narrow bands of wavelengths, as illustrated in FIG. 4, where a grating, shown diagrammatically at 32, selects and reflects a narrow band 34 from the relatively broad band 36 of wavelengths (depicted as an amplitude vs. frequency spectrum). The grating serves as a filter, passing a band 38 having a notch 40 corresponding to the narrow reflected band. The narrow band of wavelengths of the reflected beam is centered on a wavelength $\lambda_R$, which is determined by $$\lambda_R = 2n\lambda_B$$

where $\Lambda_B$ is the Bragg period of the grating, and n is the index of refraction of the core of the fiber.

A tapped Bragg grating operates by scattering light, in a broader band of wavelengths, laterally through the cladding, instead of reflecting it along the axis of the fiber.

The two-beam approach depicted in FIG. 1 requires several optical components, is vibration-sensitive, and somewhat difficult to adjust to change the Bragg period, because of the need to tilt two mirrors, and to position the fiber at a location which depends on the angles of the mirrors.

Figure 5:
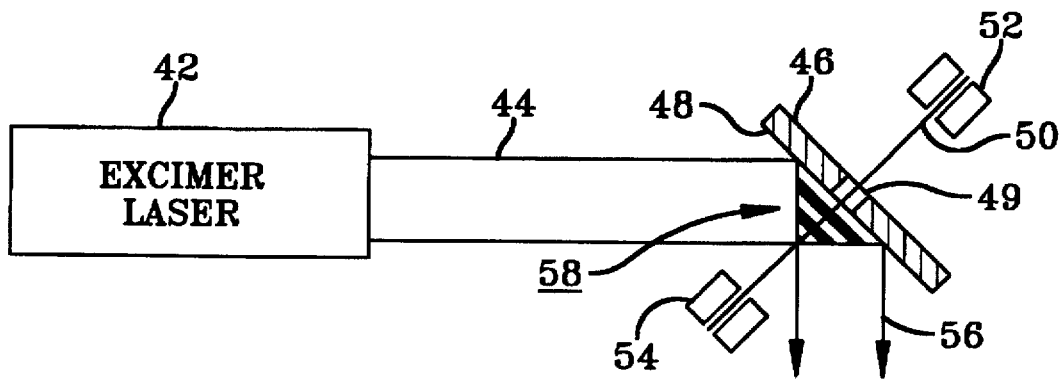
FIG. 5 is a diagram illustrating the production of a fiber optic Bragg grating using the method and apparatus of this invention.

As shown in FIG. 5, a preferred embodiment of this invention uses an excimer laser 42, i.e. a pulsed, inert gas/halogen laser producing intense radiation in the ultraviolet region, capable of inducing photochemical reactions. The beam 44 can be directly from the laser, or can be optically modified by a series of lenses (not shown), for example to widen the beam. A mirror 46 has its reflecting surface 48 facing the light source, and in oblique relation to the laser beam. This mirror preferably has a reflecting surface carefully polished so that it has no surface variations exceeding one tenth of the wavelength of the laser light. For example in the case of laser wavelength of 351 nm, produced by a XeF laser, the surface variations of the mirror should not exceed approximately 35.1 nm.

The mirror may be a first surface or second surface mirror. A second surface mirror is preferred because the laser beam has a tendency to ablate the reflecting surface on a first surface mirror, whereas in the case of a second surface mirror, the transparent coating covering the reflecting surface tends to protect the reflective surface, thereby allowing a higher energy laser beam to be used.

In general, the reflecting surface of the mirror should be flat, as a non-flat surface would ordinarily produce unsuitable interference patterns.

The mirror in FIG. 5 has an opening 49, allowing optical fiber 50 to extend through the mirror. The opening should be as small as possible, and the edge of the opening at the reflecting surface of the mirror must be very sharp, as any substantial rounding of the edge would decrease the interference region and impair the ability of the apparatus to produce a grating in the fiber. Preferably, the radius of curvature of the edge should be not greater than one tenth of the wavelength of the laser beam 44. The optical fiber is clamped in position by a pair of clamps 52 and 54, which are preferably attached to the mirror so that they remain in fixed relation to the mirror as the mirror is tilted. The laser beam is reflected by the mirror and the reflected beam 56 intersects the incident beam 44 to produce an interference pattern in a volume 58 defined by the reflection surface of the mirror and the intersection of the incident and reflected beams. The portion of the core of the fiber 50 within the volume 58 is exposed to the energy in the interference pattern and a Bragg grating is formed. The core of the fiber is appropriately doped, for example by the inclusion of Germanium, so that its refractive index can be photo-induced.

The Bragg period $\Lambda_B$ of the grating is determined by the wavelength $\lambda$ of the laser beam, and the angle α of the beam relative to a normal to the grating, in accordance with the relationship $$\Lambda_B = \frac{\lambda}{2\cos\alpha}$$

Figure 6:
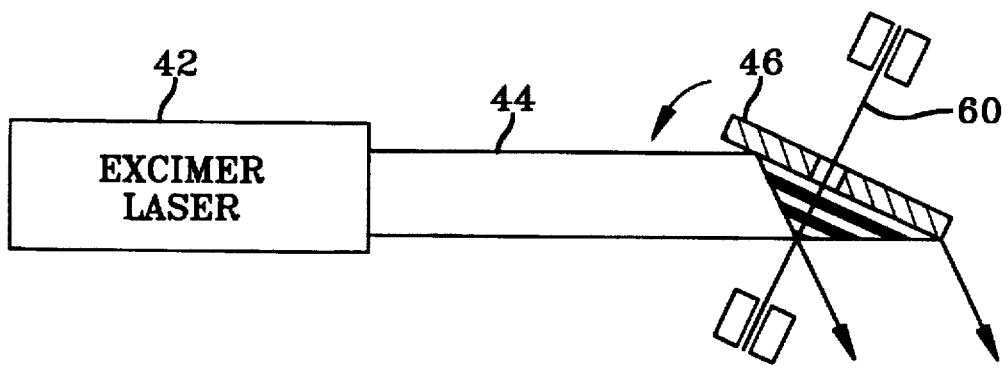
FIG. 6 is a diagram, similar to FIG. 5, illustrating how the Bragg period is adjusted by changing the angle of incidence of the laser beam on the reflecting surface of the mirror.

As shown in FIG. 6, if the mirror 46 is tilted counterclockwise to increase the angle α between the laser beam and the normal to the mirror, then the spatial period of the interference pattern increases. Consequently, it is possible, simply by tilting the mirror, to produce a grating in fiber 60 which has a Bragg period greater than that of the grating produced in fiber 50 (FIG. 5).

Various modifications can be made to the apparatus and method described above. For example, the method and apparatus can be used to make tapped gratings as well as gratings in which the lines are perpendicular to the fiber axis. This can be achieved by arranging the fiber-supporting clamps so that the fiber is mounted with its axis oblique to the reflecting surface of the mirror. Suitable adjustments (not shown) can be provided to set the angle of the fiber axis relative to the face of the mirror.

The apparatus lends itself readily to the production of fibers for distributed strain sensors, because different portions of a single fiber can be exposed successively to different interference patterns by alternately exposing the fiber, and tilting the mirror and clamp assembly. Reels for winding and unwinding the fiber can be incorporated into the tilting mirror assembly.

Figure 7:
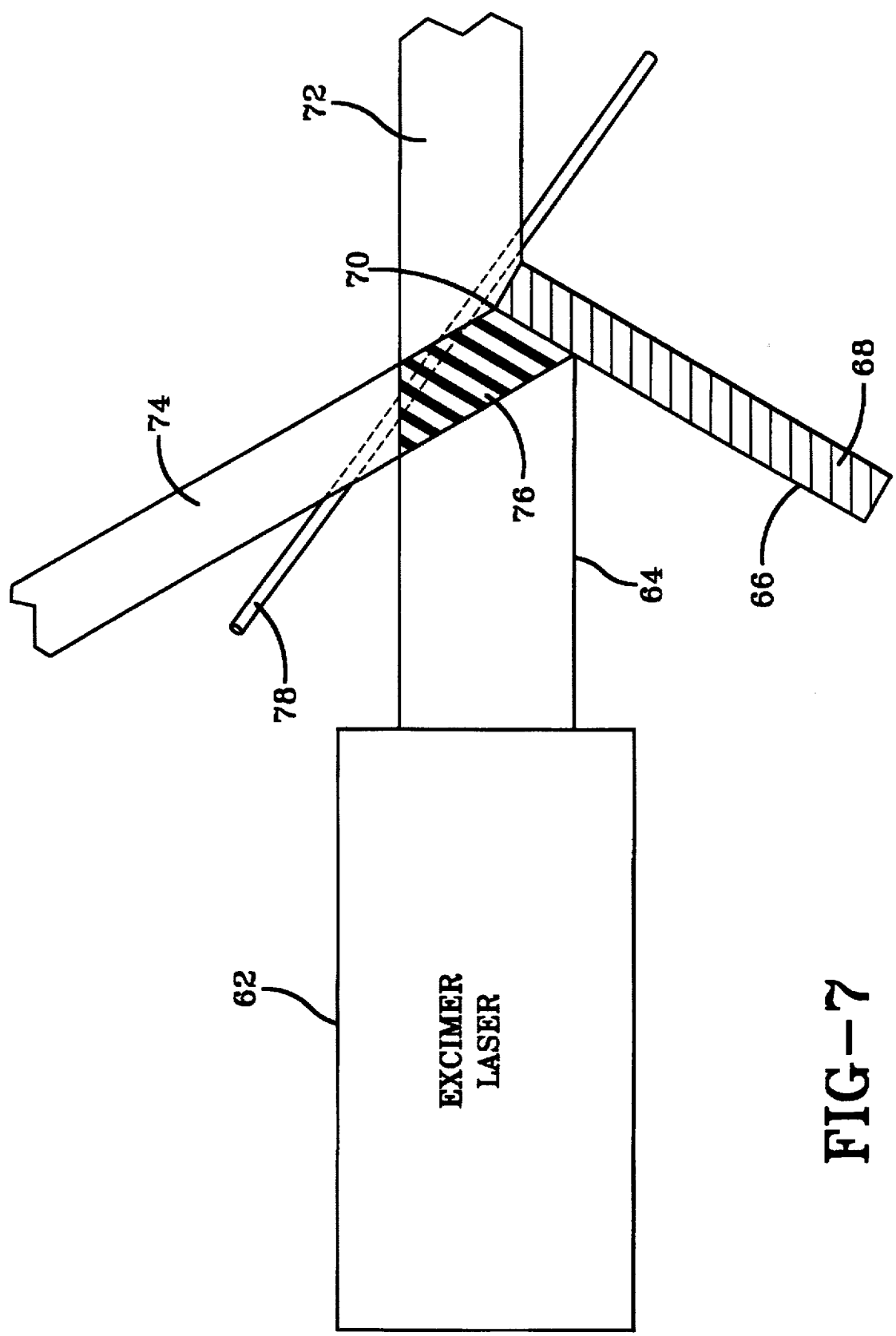
FIG. 7 is a diagram illustrating the production of a fiber optic Bragg grating using an alternative apparatus in accordance with the invention.

In the alternative apparatus depicted in FIG. 7, a laser 62 directs a beam 64 obliquely toward the reflecting surface 66 of a mirror 68, so that the beam is intercepted by a sharp edge 70 of the reflecting surface. Consequently a part 72 of the beam passes the mirror, while another part 74 is reflected. The intersection of the reflected part 74 with the beam 64 produces an interference pattern in a region 76. The interference pattern produces a Bragg grating in the core of an optical fiber 78, which extends past the mirror in close proximity to edge 70, and through the interference region 76.

In the apparatus of FIG. 7, as in the apparatus of FIGS. 5 and 6, the edge 70 should be very sharp, and preferably with a radius of curvature less than one-tenth the wavelength of the laser beam. Likewise, the mirror should be flat and smooth, with no surface irregularities or variations exceeding one-tenth the wavelength of the laser beam. The mirror can be tilted relative to the laser beam to change the interference pattern. This makes it possible to produce a grating have any desired Bragg period within a wide range. A clamp (not shown) can be provided to hold the fiber in fixed relation to the mirror to minimize the effects of vibration, and the clamp can be made adjustable so that the fiber can be tilted relative to the mirror in order to produce oblique grating lines for a tapped Bragg grating.

Figure 8:
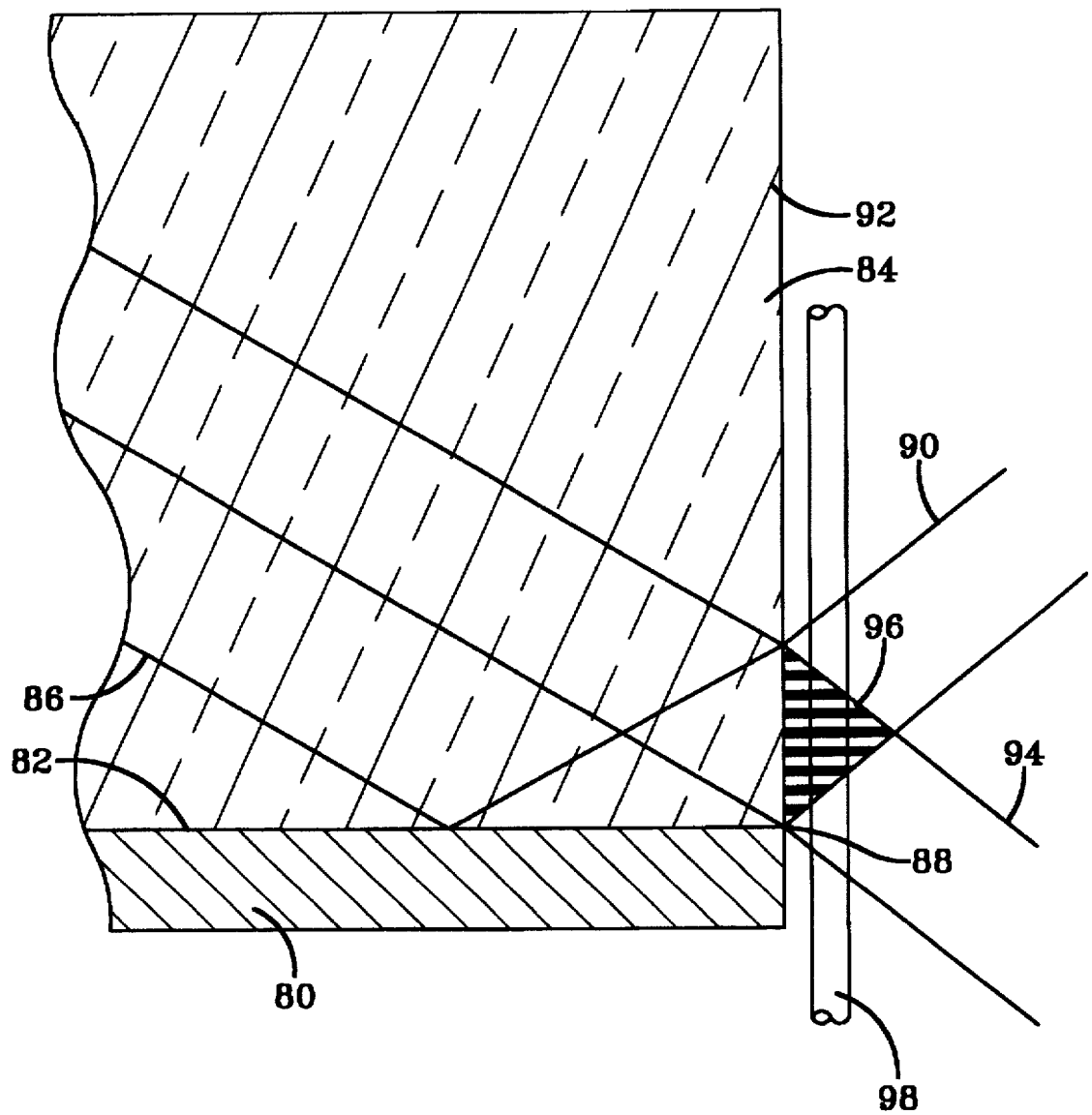
FIG. 8 is a diagram illustrating the production of a fiber optic Bragg grating using another alternative apparatus in accordance with the invention.

As mentioned previously, it is desirable to provide a coating on the mirror to protect the mirror. However, the mirror can be protected by a comparatively thick transparent layer as shown in FIG. 8. A mirror 80, having a reflecting surface 82 underlies a layer 84 of fused silica, for example. The laser beam 86 can enter the fused silica layer either from the top or from the side. A sharp edge 88 of the reflecting surface 82 intercepts the laser beam so that a part 90 of the beam is reflected by surface 82 and passes through a side surface 92 of the fused silica layer, which is substantially aligned with edge 88. Another part 94 of the beam passes directly through side surface 92. The two parts 90 and 94 of the beam intersect each other to form an interference pattern in region 96. A grating may be formed in the core of an optical fiber 98, by positioning a part of the fiber in the interference region.

The fiber can be tilted (in a plane perpendicular to the plane of the drawing) to produce oblique grating lines, if desired. The Bragg period $\Lambda_B$ can be determined by selecting an appropriate angle of the laser beam relative to the mirror. The Bragg period is dependent on the wavelength $\lambda$ of the laser beam, the angle $\alpha$ at which the laser beam approaches the reflecting surface 82 within the transparent layer 84, and the index of refraction n of the transparent layer, in accordance with the relationship $$\Lambda_B = \frac{\lambda}{2n\cos\alpha}$$

Many other modifications and variations of the invention are possible in view of the above disclosure. It is therefore to be understood that, within the scope of the appended claims, the invention may be practiced other than as specifically described.

We claim:

1. Apparatus for forming a Bragg grating in an optical fiber comprising:

a mirror having a reflecting surface;

means for generating a coherent beam of monochromatic light and directing the beam in a first direction so that at least part of the beam is an incident beam, incident, in said first direction, on the reflecting surface of the mirror;

the reflecting surface of the mirror being oblique with respect to said first direction so that the incident beam is reflected to produce a reflected beam in a second direction different from the first direction and the reflected beam intersects the beam directed in the first direction, whereby an interference pattern is produced within a volume defined by the intersection of the beam directed in the first direction and the reflected beam; and means for supporting an optical fiber so that at least a part of the fiber is within said volume; whereby a grating is photo-induced in the optical fiber by the interference pattern.

2. Apparatus in accordance with claim 1 including means for adjusting the inclination of the reflecting surface of the mirror with respect to said first direction, whereby the period of the interference pattern can be adjusted.

3. Apparatus in accordance with claim 1 in which the variations in the smoothness of the reflecting surface are within one-tenth of the wavelength of the coherent beam of monochromatic light.

4. Apparatus in accordance with claim 1 in which the means for supporting the optical fiber is arranged to position a portion of the fiber adjacent to an edge of the reflecting surface of the mirror, and in which said edge has a sharpness such that its radius of curvature is less than one-tenth of the wavelength of the coherent beam of monochromatic light.

5. Apparatus in accordance with claim 1 in which the mirror has a transparent solid layer covering its reflective surface, said solid layer having a side surface extending transverse to the reflecting surface substantially from an edge thereof, and in which the coherent beam of monochromatic light is directed so that it is intercepted by said edge, whereby a first part of the beam is reflected by the reflecting surface of the mirror, a second part of the beam passes through said side surface, and both of said first and second parts intersect to produce said interference pattern.

6. Apparatus in accordance with claim 1 in which the mirror has an opening for receiving the optical fiber, the opening having an edge, at the reflecting surface, the edge having a sharpness such that its radius of curvature is less than one-tenth of the wavelength of the coherent beam of monochromatic light.

7. A method for forming a Bragg grating in an optical fiber comprising exposure of the core of an optical fiber to an external interference pattern produced by the intersection of a coherent beam of monochromatic light directed in a first direction and the reflection of at least part of said beam from a reflecting surface oblique with respect to said first direction and positioned to intercept said at least part of said beam.

8. A method for forming a Bragg grating in an optical fiber comprising:

directing a coherent beam of monochromatic light in a first direction so that at least part of the beam is an incident beam, incident obliquely on a reflecting surface to produce a reflected beam in a direction different from that of the incident beam, and thereby producing an interference pattern within a volume defined by the intersection of the reflected beam and said coherent beam of monochromatic light directed in said first direction;

positioning a part of an optical fiber in said volume; and photo-inducing a grating in the optical fiber by exposure of the optical fiber to the interference pattern.

9. A method in accordance with claim 8 in which, following the photo-inducing of a grating, the coherent beam of monochromatic light is directed so that at least part of said coherent beam of monchromatic light is an incident beam, incident obliquely on said reflecting surface at a different angle of incidence to produce a second reflected beam in a direction different from that of the last-mentioned incident beam, and thereby producing another and different interference pattern within a volume defined by the intersection of the second reflected beam and said coherent beam of monochromatic light;

positioning a part of an optical fiber in said volume; and photo-inducing a grating in the last-mentioned optical fiber by exposure of the last-mentioned optical fiber to said different interference pattern.

10. A method in accordance with claim 9 in which said part of an optical fiber is positioned in said volume by positioning the fiber in proximity to an edge of the reflecting surface.

11. A method in accordance with claim 9 in which said part of an optical fiber is positioned in said volume by inserting the fiber though an opening in the reflecting surface.

12. A method in accordance with claim 9 in which the angle of incidence of said incident beam is adjusted by tilting the reflecting surface.

13. A method in accordance with claim 8 in which the angle of incidence of said incident beam onto the reflecting surface is adjusted before photo-inducing said grating.

14. A method in accordance with claim 8 in which the angle of incidence of said incident beam is adjusted by tilting the reflecting surface.

* * * * *